United States Patent [19]  [11] Patent Number: 5,078,163
Holley  [45] Date of Patent: Jan. 7, 1992

[54] DISC ASH CONDITIONER

[76] Inventor: Carl A. Holley, 14315 Tall Oaks, Riverview, Mich. 48192

[21] Appl. No.: 643,322

[22] Filed: Jan. 22, 1991

[51] Int. Cl.$^5$ .............................................. B08B 3/04
[52] U.S. Cl. ................................... 134/153; 134/182; 134/198; 134/201; 134/200; 366/210; 118/417
[58] Field of Search ...................... 134/153, 200, 104.4, 134/140, 157, 182, 198, 201; 366/210, 221, 232, 233, 237, 234; 51/163.1, 163.2, 163.4; 118/417, 19; 427/3, 212

[56] References Cited

U.S. PATENT DOCUMENTS

| | | | |
|---|---|---|---|
| 1,042,929 | 10/1912 | Lanaux | 366/221 |
| 2,293,439 | 8/1942 | Lloyd | 366/221 |
| 2,889,576 | 6/1959 | Selig | 366/221 X |
| 2,947,026 | 8/1960 | De Vaney | 366/221 |
| 3,115,821 | 12/1963 | Hubner | 360/221 |

FOREIGN PATENT DOCUMENTS

| | | | |
|---|---|---|---|
| 46581 | 11/1909 | Switzerland | 366/221 |
| 338241 | 7/1970 | U.S.S.R. | 366/221 |

Primary Examiner—Frankie L. Stinson
Attorney, Agent, or Firm—William J. Ruano

[57] ABSTRACT

Apparatus for uniformly wetting and discharging ash. It is enclosed in a dust hood. It comprises an open top pan disposed at an angle of about 55° degrees with respect to a floor, rotated at slow speed. An ash charge chute discharges ash into the pan. Fixed scraper means extend at right angles to the pan to scrape the bottom of the pan while water is sprayed onto the surface of the discharged ash so that the rotated ash is tumbled back to the bottom of the pan to effect uniform wetting of the tumbled particles as they are discharged downwardly from the top of the side of the pan.

2 Claims, 3 Drawing Sheets

DISC ASH CONDITIONER

This invention relates to a rotating disc ash conditioner.

BACKGROUND OF THE INVENTION

One of the major requirements of smoke stacks is the requirement to remove sulfur dioxide ($SO_2$) gas from the combustion gas stream. This is generally accomplished by spraying a lime solution into the gas stream. As the small droplets of lime solution come into contact with the sulfur dioxide in the gas stream, the calcium in the lime solution reacts with the gas sulfur dioxide to form calcium ($CsSO_4$) and calcium sulfate ($CASO_3$) which are solids that can be removed by dust collectors. There is also unreacted lime ($CaO$) which is removed by the dust collectors along with the combustion fly ash.

Before the sulfur dioxide scrubbers were installed, the fly ash could be conditioned with a water addition in a paddle or drum mixer. While these units did a marginal job, it was acceptable and low in cost. With the ash from sulfur dioxide scrubbers, the lime, calcium sulfide and calcium sulfate together with the fly ash all of which are very fine particles make the blend of materials act like a pozzuolanic or portland cement. When water is added in a paddle mixer, the fly ash begins to set and hardens so that the paddles are constantly wearing against the hardened cement liner and causing breakdowns.

SUMMARY OF THE INVENTION

An object of the present invention is to overcome the above-mentioned problems by utilizing a disc pelletizer with a special right angular plow arrangement in a continuous line across part of the face of the pan and totally enclosing the pan of the disc pelletizer, whereby an ash conditioner is provided that does not release any dust, has very little wear and produces a uniformly conditioned fly ash.

DETAILED DESCRIPTION OF THE PREFERRED EMBODIMENT

Figure 1:
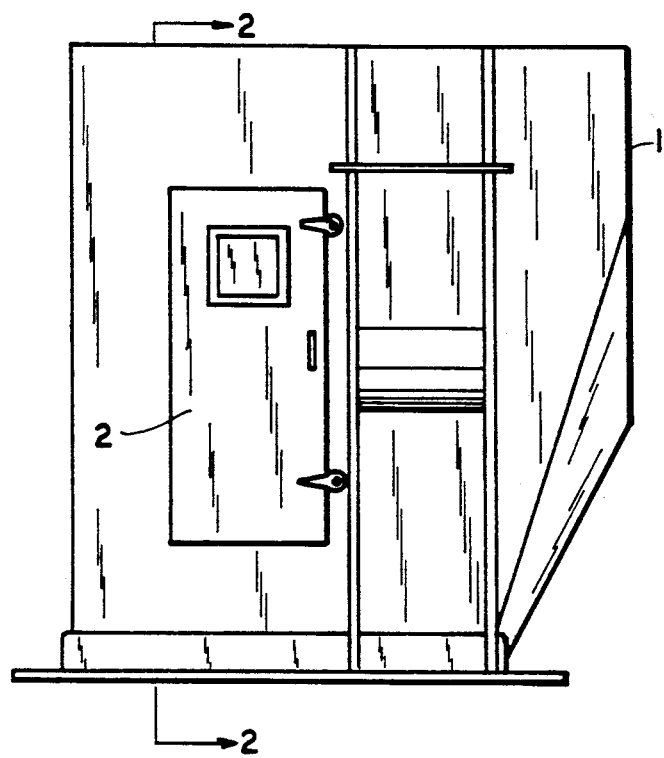
FIG. 1 is an elevational view of a dust hood which encloses the ash conditioner of the present invention.
Figure 2:
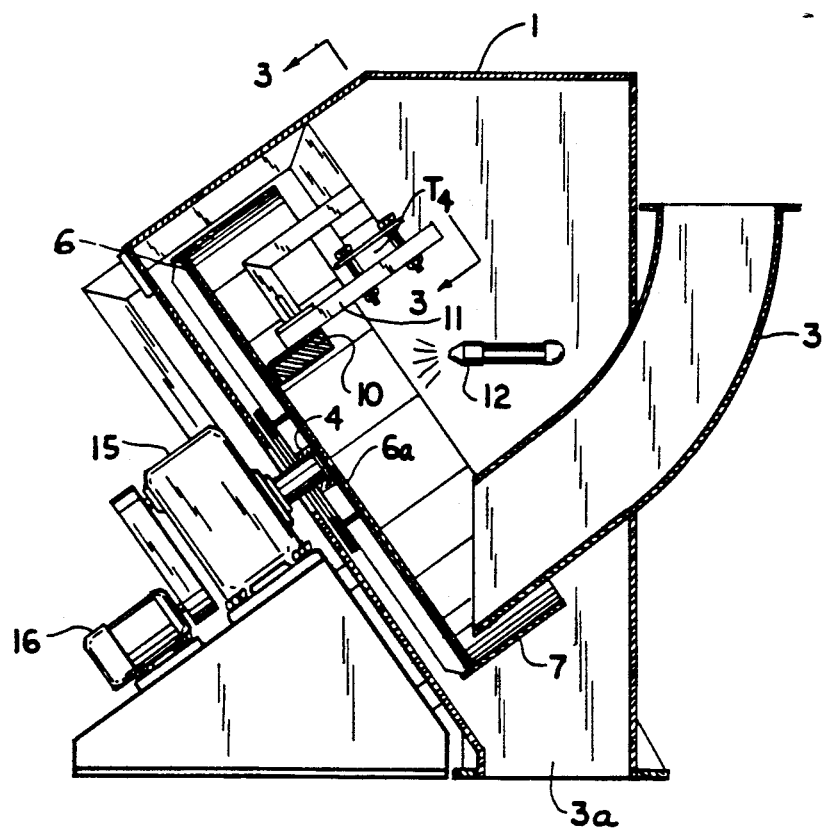
FIG. 2 is a vertical sectional view taken on line 2—2 of FIG. 1.

Referring to FIGS. 1 and 2, numeral 1 denotes a dust hood for enclosing the rotatable pan, which dust hood has a door 2 and an inlet chute 3 for receiving fly ash and feeding it to a rotatable pan 6 having a cylindrical wall 7. The pan 6 has a hub 4 and stiffeners 5, better shown in FIGS. 7–12.

More of the plows or scrapers are located in a continuous line across the face of the pan and have an augularly disposed end plow. The plows 10 are located at right angles to the mesh 6a covering the bottom of the pan 6 so that they scrape mesh 6a of the pan and so that they interfere with the flow of the fly ash as it is carried up the face of the pan. This interference causes the fly ash to tumble, particularly because of the substantially critical 55° degree angularity of the pan with respect to the floor thereby opening or spreading the individual particles so that a water spray 12 can wet each particle. The sorting or classification action of the disc pan makes the larger, wet particles rise to the top surface of the bed of ash and keeps dry or unwet particles from exiting the pan. This action insures that all of the particles are wet before they discharge from the pan.

The side wall 7 of the pan 6 is coated with non-stick material such as a product named BR-3s sold by Normac, Lisle Illinois or a product known as Tyvar 88 made by Menasha Corp. of Fort Wayne, Ind. or a product named Durall 55 of RMS Corp., Lawrence, PA. The non-stick coating reduces the friction of the scrapers on the side wall, thereby reducing the power required to rotate the pan.

The plows or scrapers 10 are manufactured of very abrasive resistant refractory mounted by gluing them to a rigid steel plate 11.

Figure 6:
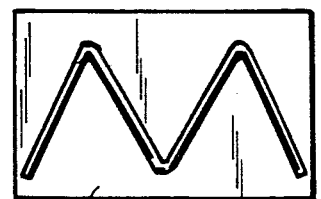
FIG. 6 is a view taken along line 6—6 of FIG. 5.

FIG. 6 shows how the rigid one inch mounting plates 11 are grooved to insure that the glue adheres to the steel mounting plate. While many structural adhesives would perform this function, however a preferred product is produced by Ciba-Geigy; under the trademark Araldite AV138 with Hardener HV998. The refractory blockor plow 10 is bolted to the steel mounting plate 11 in addition to being glued to the plate. The wear surface of the plow can be any type refractory material.

An alumina-zirconia-silica cast refractory containing 45 to 55% by weight of aluminum oxide sold under the trademark "Monofrax" produced by Carborundum Corporation performs very satisfactorily. The refractory needs to be thick to resist the wear of the pan bottom. A three (3) inch thickness functions very well.

Figure 3:
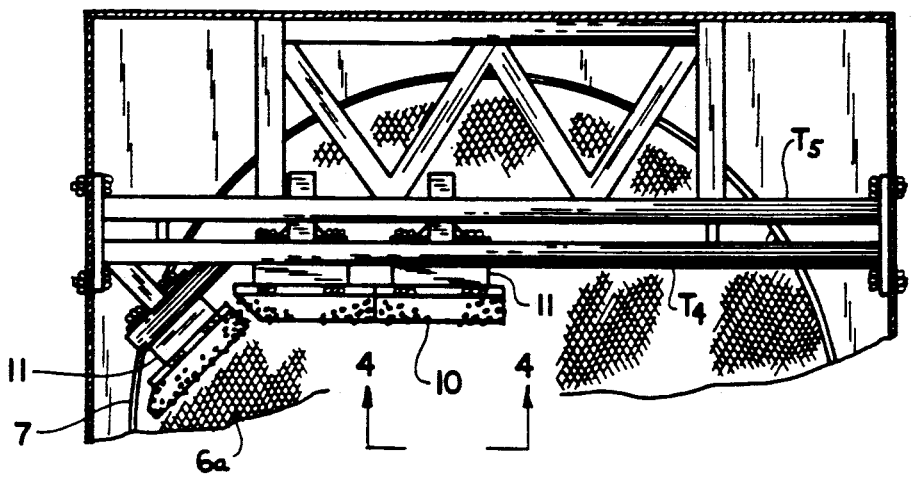
FIG. 3 is a sectional view taken along line 3—3 of FIG. 2.
Figure 4:
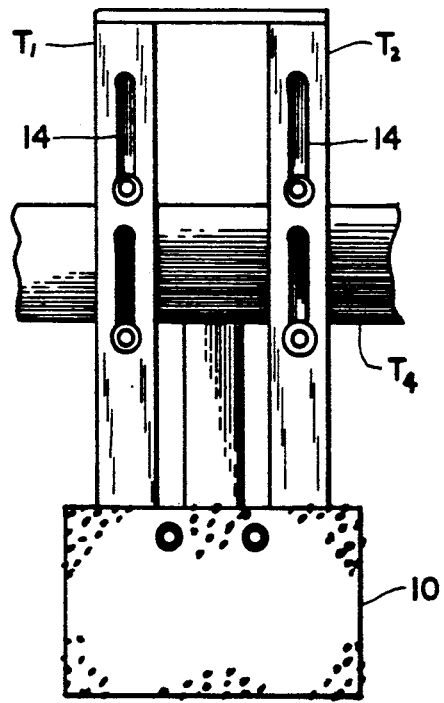
FIG. 4 is an enlarged view of the plows or scrapers taken along line 4—4 of FIG. 3.
Figure 5:
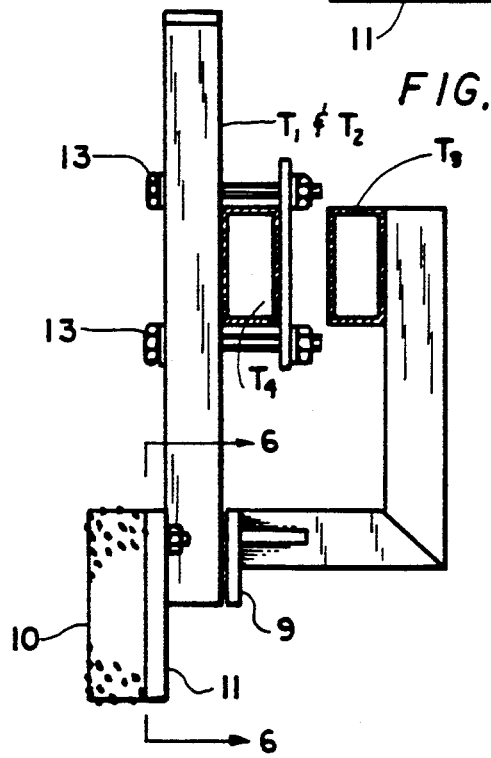
FIG. 5 is a side view of the plows or scrapers shown in FIG. 4.

Referring to FIGS. 3, 4 and 5, tubes $T_1$ and $T_2$ are welded to the rigid steel plate 11 and are supported and are laterally adjustable by tube $T_4$ through a clamped plate. As can be seen in FIG. 4, tubes $T_1$ and $T_2$ are slotted at 14 of the bolted supports 13 so they can be adjustably lowered or raised with relation to the pan bottom without removing the clamping bolts. The back of the support tubes $T_1$ and $T_2$ is braced by a plate 19 which is welded to tube $T_3$. This support allows the scrapers to take large shock loadings.

Figure 7:
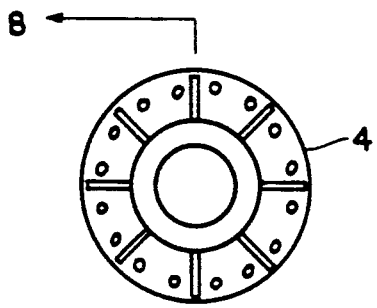
FIG. 7 is an enlarged view of the hub 3, shown in FIG. 2, of the gear reducer 15.
Figure 8:
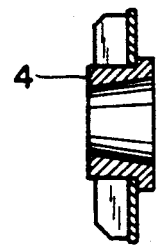
FIG. 8 is a vertical sectional view taken along line 8—8 of FIG. 7.
Figure 9:
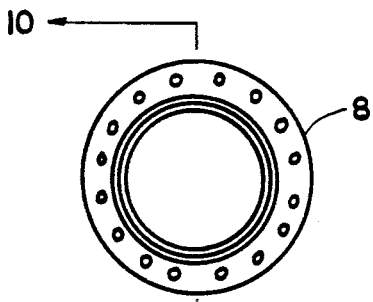
FIG. 9 is an enlarged view of the element 8 of FIG. 12.
Figure 10:
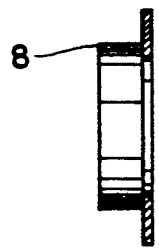
FIG. 10 is a vertical sectional view taken along line 10—10 of FIG. 9.
Figure 11:
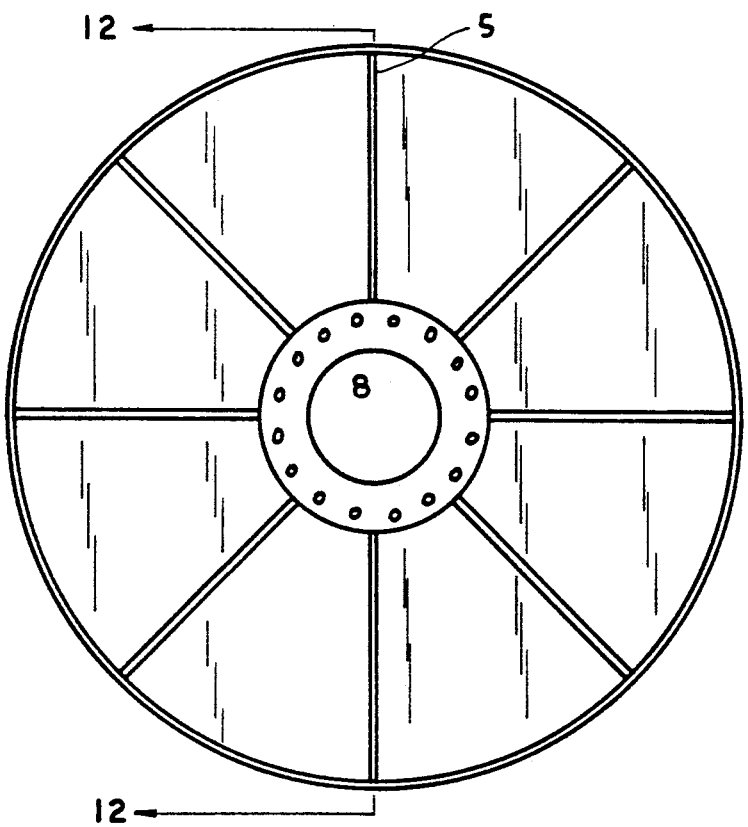
FIG. 11 is an enlarged elevational view of the rotatable pan 7 shown in FIG. 2.
Figure 12:
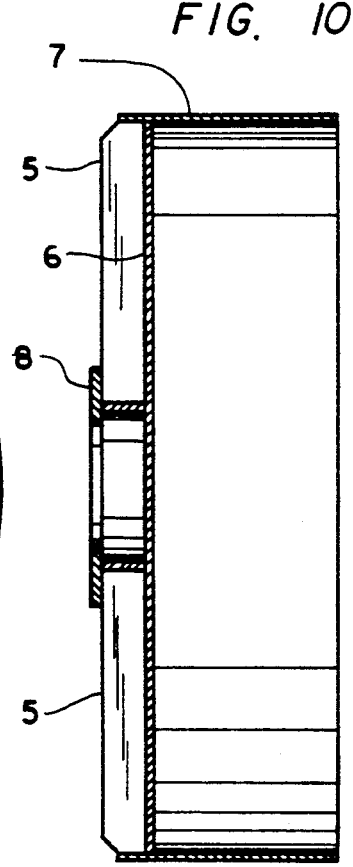
FIG. 12 is a vertical sectional view taken along line 12—12 of FIG. 11.

The pan 6 of the disc pelletizer ash conditioner is mounted on the low speed shaft of a gear reducer 15 of driving motor 16 as shown on FIG. 2. As shown in FIGS. 7 and 8, pan mounting hub 4 is held onto the low speed shaft with a taper lock bushing or a bored-to-size hub. The plate on the pan mounting hub is match drilled with the pan mounting flange 8 shown in FIGS. 9 and 10. The pan mounting flange is attached (welded) to the pan as shown in FIGS. 11 and 12. The large mounting flange permits shimming between the pan mounting hub and the mounting flange to insure that all points of the pan bottom plate are in the same plane as it rotates about the low speed shaft of the reducer.

The pan slope shown in FIG. 2 is preferably about 55° degrees from the horizontal. This slope is best for tumbling the ash so it can be wet by the water spray. Other slopes will not be as satisfactory, but they will perform to some extent.

The rotational speed of the pan has been found to be best at 5 to 6 RPM for an 8' diameter pan. For best mixing, the depth of the pan has been found to be:

$$d = D^{0.65}$$

where:
d = depth in inches and
D = pan diameter in inches.

Other depths can be utilized, but this depth seems to provide the best mixing and the proper retention time.

The discharge point from the pan is arranged so that the conditioned material exiting over the edge of the pan drops through the open bottom 3a of the enclosure and onto a conveyor below. (not shown) This arrangement insures that there is no build-up of material inside the enclosure.

While I have illustrated and described a single specific embodiment of my invention, it will be understood that this is by way of illustration only and that various changes and modifications may be contemplated in my invention within the scope of the following claims.

I claim:

1. Apparatus for uniformly wetting and discharging ash, comprising a cylindrical, open top pan, sloped at an angle of about 55° degrees with respect to a floor, a mesh covering the floor of said pan, a motor for rotating said pan about 5 to 6 r.p.m., an ash charge chute discharging ash into the lowermost portion of said pan, fixed scraper means of abrasive resistant refractory blocks including an end scraper disposed angularly at an obtuse angle and extending at right angles to the surface of said mesh on the bottom of said pan and occupying a portion of the surface of said pan, means for adjusting the height of said refractory blocks, means for adjusting said blocks laterally, water spraying means for spraying water onto the surface of said discharged ash as it is being scraped in said pan, whereby said rotated ash will be effectively tumbled back to the bottom of said pan by said scraper means to enable uniform wetting of practically all the particles of tumbled ash as it is discharged downwardly from the top of the side of said pan, and a dust hood totally enclosing said pan having an open bottom for discharging conditioned ash.

2. Apparatus as recited in claim 1 wherein said abrasive resistant refractory blocks are of cast alumina-zirconia-silica.

* * * * *